Feb. 14, 1967 D. A. WILBUR ETAL 3,304,463

CROSSED-FIELD AMPLIFIER DEFINING A TRANSMISSION LINE

Filed Sept. 10, 1962 2 Sheets-Sheet 1

Inventors:
Donald A. Wilbur,
Philip N. Hess,
by Philip J. Schlamp
Their Attorney.

CROSSED-FIELD AMPLIFIER DEFINING A TRANSMISSION LINE

Filed Sept. 10, 1962 2 Sheets-Sheet 2

Inventors:
Donald A. Wilbur,
Philip N. Hess,
by Philip L. Schlamp
Their Attorney.

United States Patent Office 3,304,463

Patented Feb. 14, 1967

3,304,463

CROSSED-FIELD AMPLIFIER DEFINING A TRANSMISSION LINE

Donald A. Wilbur, Scotia, N.Y., and Philip N. Hess, Los Altos, Calif., assignors to General Electric Company, a corporation of New York Filed Sept. 10, 1962, Ser. No. 222,510
12 Claims. (Cl. 315—39)

The present invention relates to transverse wave amplifiers and pertains more particularly to new and improved crossed-field electric discharge devices adapted for high-power R.F. amplification at microwave frequencies.

In order to generate R.F. power at the so-called "superpower" levels, or levels above approximately 100 kw. average at 3000 mc., it is necessary to provide a device wherein the interaction volume is substantially large. Furthermore, in such a device high operating efficiency is extremely desirable inasmuch as even a small decrease in operating efficiency represents large increases in both the amount of D.C. power required and in the heat generated, and therefore the cooling capacity required, for operating at a high power levels.

Prior art crossed-field electric discharge devices of the magnetron type are well known for their high operating efficiency and resultant minimal D.C. power and cooling requirements. Additionally, such devices are noted for their simplicity of construction and ruggedness.

The present invention contemplates a fast-wave crossed-field electric discharge device, constructed to incorporate those structural features which adapt magnetrons for the above-mentioned desirable attributes, further constructed in a manner to provide a substantially large interaction volume required for superpower operation, and not contemplated in the prior art.

Accordingly, a primary object of the present invention is to provide a new and improved transverse wave amplifier adapted for high-power, high-efficiency operation at microwave frequencies.

Another object of the present invention is to provide a new and improved fast-wave, crossed-field amplifier including structure providing a substantially increased interaction volume and thereby adapted for substantially increased power generating and handling capacities.

Another object of the present invention is to provide a new and improved fast-wave, crossed-field amplifier adapted for substantially greater power capacities than conventional crossed-field devices but including those structural features of conventional crossed-field devices whereby high operating efficiences are obtainable.

Another object of the present invention is to provide a new and improved transverse wave amplifier including an electrically compatible combination of both the structural features of conventional crossed-field interaction devices, whereby desired high operating efficiency is attainable, and structure effective for providing a substantially increased interaction volume, whereby increased power generating and handling capacities are attained at the desired high operating efficiency.

Another object of the present invention is to provide a new and improved R.F. amplifying device adapted for substantial high power, high-efficiency amplification at microwave frequencies and yet is characterized by relatively simple construction, ruggedness and desirable thermal properties.

Further objects and advantages of the present invention will become apparent as the following description proceeds and the features of novelty which characterize the invention will be pointed out with particularity in the claims annexed to and forming part of this specification.

In carrying out the objects of the invention there is provided a transverse wave amplifier including a fast-wave, crossed-field magnetron interaction structure defining a coincident transmission line. The transmission line has an electric field established between the conductors thereof and is adapted for supporting and propagating a fast electromagnetic wave signal having a phase velocity equal to or greater than the velocity of light along a predetermined path therebetween. Means is provided for directing a stream of electrons between the conductors transverse to both the electric field and the direction of fast-wave propagation and other means provides a magnetic field extending parallel to the direction of propagation. The device also includes electromagnetic wave input and output means coupled to the transmission line at longitudinally spaced sections along the path of propagation for introducing the fast wave signals to be amplified and extracting an amplified signal. The mode of propagation is such that a transverse electric field having an apparent phase velocity much less than the velocity of light exists at every cross-section of the device. This transverse, relatively slow traveling electric field is synchronized with and interacts with the electron stream traveling in the transverse plane with the result that the electron potential energy is extracted and is continually added to the R.F. wave propagating along the transmission line, thereby to effect amplification thereof.

For a better understanding of the present invention reference may be had to the accompanying drawing wherein.

Figure 1:
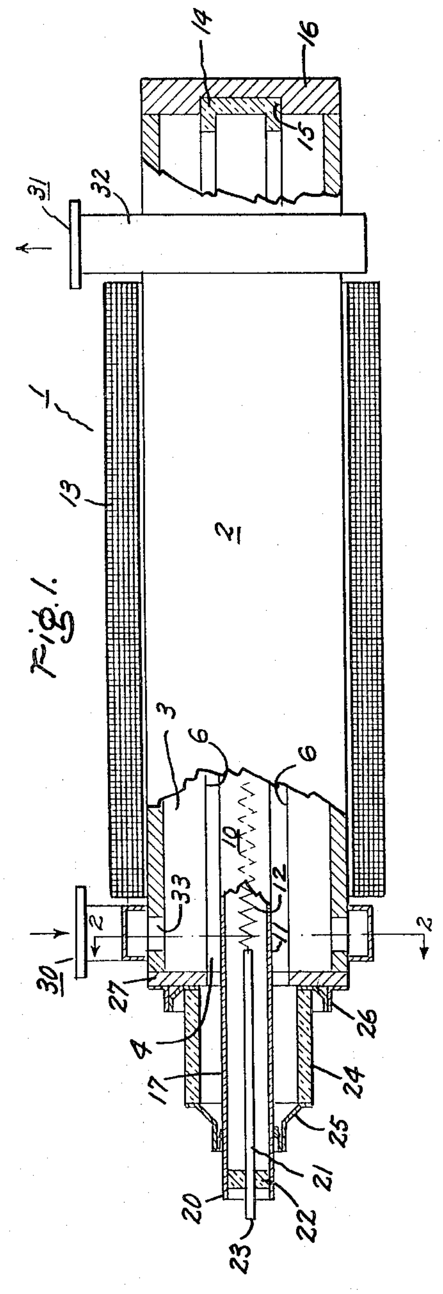
FIGURE 1 is a partially sectionalized side elevational view of a fast-wave, crossed-field electric discharge device constructed according to an embodiment of the present invention.

Referring now to the drawing, there is shown in FIGURE 1 a crossed-field device constructed according to an embodiment of the invention and generally designated 1. The device 1 includes an evacuated elongated cylindrical conductive envelope 2 which, as better seen in FIGURE 2, supports therein an elongated anode structure generally designated 3. The anode structure 3 can comprise a generally cylindrical conductive block formed, as by machining, to include a central space 4 and a plurality of circumferentially spaced cavities 5 communicating with or opening into the central space 4. Expressed in another manner, the anode structure comprises a plurality of radially extending circumferentially equally spaced anode segments 6, and immediately adjacent pairs thereof cooperate in defining the resonator cavities 5. The cavities and anode segments can be provided by forming the cavities in a cylindrical block in the manner illustrated or, alternatively, can be formed by constructing the anode structure to include a plurality of circumferentially spaced, radially extending vanes mounted on the inner wall of the conductive cylinder 2.

Coaxially located in the central space 4 of the anode structure is a cathode assembly generally designated 10. As illustrated in FIGURE 1, the cathode assembly 10 can be of the indirectly heated type and can include a cylindrical outer member 11 containing a heating element 12. The outer cathode member 11 has an electron emissive outer surface and preferably extends the full length of the device in the manner shown in FIGURE 1. Thus, the outer cathode member 11 and the anode structure 4 cooperate in defining an elongated cylindrical magnetron interaction space adapted for having an electric field established therein between the cathode and anode. Provided for establishing a magnetic field in transversely extending, or crossed, relation to the electric field is a magnetic means which can comprise an elongated solenoid coil 13 surrounding the device envelope and effective for providing a static magnetic field coaxial with the device envelope. To this point the device resembles in cross-section a conventional $\pi$-mode oscillating magnetron. However, in contradistinction to the conventional magnetron structure the cathode member 11 and the anode structure 4 of the present device, in addition to defining a magnetron interaction space therebetween also cooperate in defining a coincident coaxial transmission line adapted for supporting and propagating a longitudinally traveling electromagnetic wave. The propagation path of such wave extends transverse to the electric field and parallel to the directions of the anode segments and the magnetic field, and the purpose for this relationship will be brought out in detail hereinafter.

The outer cathode member 11 can be supported at one end thereof by being positioned in an insulative cup 14 retained in a central recess 15 in an end cap 16 provided for completing one end of the envelope of the device. At the opposite end of the device the cathode member 11 can include a cylindrical extension 17 which protrudes beyond the end of the conductive envelope 2 and includes an exposed surface 20 for serving as an annular electrical contact. In a manner not shown, one end of the heater element 12 is electrically connected to the outer cathode member 11. Thus, the contact 20 is adapted for serving for both a cathode contact and one side of the heater circuit. The other side of the heater circuit includes a rod-like conductor 21 disposed coaxially in the outer cathode member 11. These elements are mutually insulated and hermetically joined by an insulative washer-like element 22. An end portion 23 of the conductor 21 extends exposed for serving as an electrical contact.

The contact end of the cathode assembly is coaxially sealed to the anode structure by means including an insulative cylinder 24, a flanged sealing ring 25 joined between the outer surface of the extension 17 of the outer cathode member and one end of the insulative cylinder 24 and a sealing ring arrangement 26 sealed between the opposite end of the insulative cylinder 24 and an annular conductive end plate 27 sealed to the corresponding end of the device envelope 2. Thusly is provided a complete envelope structure adapted for evacuation and containing anode and cathode structures cooperating to provide the above-mentioned elongated magnetron interaction structure and coaxial transmission line, or two-conductor wave-guiding system.

Figure 2:
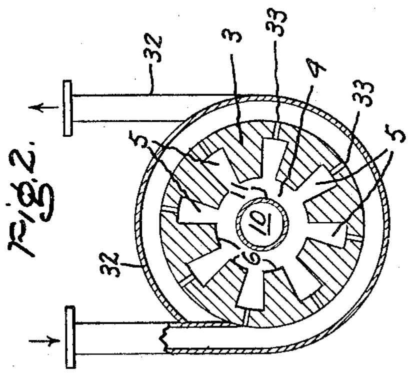
FIGURE 2 is a partially sectionalized view taken along the lines 2—2 in FIGURE 1 and looking in the direction of the arrows.

Provided at the opposed ends of the device 1 are input and output electromagnetic wave energy coupling means generally coupling means generally designated 30 and 31, respectively. As seen in FIGURES 1 and 2, these coupling means can comprise waveguide couplers each including a waveguide section 32 wrapped about an end of the device and coupled to each resonant cavity 5 by a coupling iris 33. If desired, the waveguides can be directly coupled to equally spaced cavities but less than all, it being required only that the coupling means be adapted for uniformly circumferentially exciting or extracting energy from the cavities to which they are coupled. As indicated by the arrows in FIGURES 1 and 2, an electromagnetic wave signal coupled into the device through the input coupler 30 at one end can propagate lengthwise through the device along the coaxial transmission line defined by the coaxial anode and cathode elements toward the opposite end of the device for extraction through the output coupler 31 located at the opposite end. Each waveguide coupler is provided with a dielectric window effective for hermetically sealing the waveguides of the couplers while permitting electromagnetic wave energy transmission therethrough. These windows can be of the conventional type and are not shown in the drawing.

Figure 3:
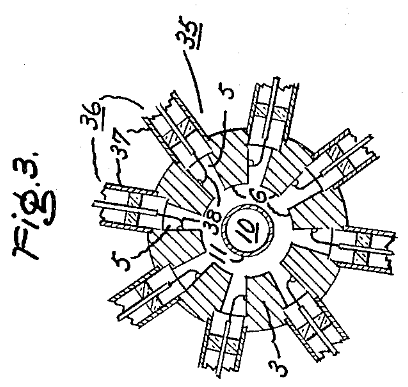
FIGURE 3 is a sectionalized view of a modified coupling arrangement employable at either or both the input and output sections of the device of FIGURE 1.

Illustrated in FIGURE 3 is a modified form of coupling arrangement adapted for uniformly introducing signals to be amplified and extracting amplified energy from the device. This arrangement generally designated 35 can constitute either the input or output coupling structure and comprises a plurality of individual coaxial R.F. terminals 36 having the outer conductors 37 thereof conductively connected to the device envelope and the inner conductors connected to individual coupling loops 38 extending into each of the cavities 5. In this arrangement too the coupling means need not be provided in each resonator cavity, it being sufficient if they are provided in a plurality of equally spaced cavities and adapt-for circumferentially uniformly introducing a signal or extracting energy from the device. If desired, all of the input coaxial terminals 36 of the arrangement 35 can be coupled to a single line including a power divider effective for dividing power equally to the terminals. A similar single power output line can be coupled to the output terminals at the output section of the device whereby the power from the individual terminals can be added for transmission to a power utilization device.

The coaxial transmission line provided by the cooperating anode and cathode structures may be thought of as a length of coaxial line having a complex cross-sectional geometry. Such a line is characterized by a TEM transmission mode plus sets of TE and TM modes. Each TE wave is characterized by a particular transverse electric field pattern. Conventional magnetron oscillators operate at or near the cut-off frequency of one of the mentioned TE modes and the power propagates in an angular direction. However, the present device operates above the cut-off frequency and, while the transverse electric field pattern in the present device is the same as in a conventional magnetron, the power propagates in the present device in the axial direction, or parallel to the anode segments 6. Additionally, the line is particularly adapted for propagating a $TE_{(N/2),1}$ mode, where N is the number of anode segments, in the axial direction and the described input couplers are effective for exciting the device in this mode. Further, the axial length of transmission line between the input and output sections of the device is at least three, and preferably three to four, free-space wavelengths at a predetermined operating or design frequency. If desired, still greater lengths are employable without detracting from the operativeness of the device.

An examination of the total electric field associated with the mentioned $TE_{(N/2),1}$ mode at any transverse plane of the device shows an electrical field distribution identical to that within a mode oscillating magnetron of the same cross-section. The periodic change in R.F. voltage between immediately adjacent anode segments, which may be described in terms of two identical contra-rotating waves in the case of a conventional magnetron, is, in the presently disclosed device, caused by the passage of the axial wave.

In the operation of a conventional $\pi$-mode oscillating magnetron, interaction between the transverse plane electric field in the interaction space and an electron cloud circulating in the transverse plane can be accomplished by predetermined selection of the magnitudes of the focussing radial D.C. electric field and D.C. axial magnetic field supplied by the solenoid 13 so as to synchronize the rotation of the electron cloud with the phase velocity of one of the apparent contra-rotating waves producing the $\pi$-mode field distribution. The interaction processes relied upon in the present device are essentially the same as in the oscillating magnetron. That is, electron potential energy from the rotating space charge is abstracted and appears as an increase in amplitude of the TE wave propagated axially down the transmission line formed by the anode and cathode structures. However, in the present device the mode of propagation which results in the mentioned interaction is such that a transverse electric field having an apparent phase velocity much less than the velocity of light exists at every cross-section of the tube. This transverse slow-traveling electric field is synchronized with the electric stream traveling in the transverse plane. Thus, amplification of the wave, or electromagnetic wave signal introduced at the input 30 is effected and the amplified wave appears at the output section 31 for being abstracted for a useful purpose.

Additionally, and as indicated above, each individual transverse section of the device acts as a conventional magnetron. Thus, the individual sections act as current generators that induce axially directed waves on the transmission line and which travel toward both the input and output. However, the input signal causes the individual sections to be so phased that the output waves reinforce while the waves traveling back toward the input are effectively cancelled as in a multi-hole directional coupler.

It is to be understood from the foregoing that the present invention is applicable in an inverted device wherein the cathode can be the outer conductor and the anode the inner conductor of the device. Additionally, the cathode need not be emissive for the full length thereof. Further, while the disclosed structure is adapted for $\pi$-mode operation, the provision of input and output means whereby electromagnetic wave energy may be coupled into and out of each resonator cavity adapts the structure for directional mode operation also.

Figure 4:
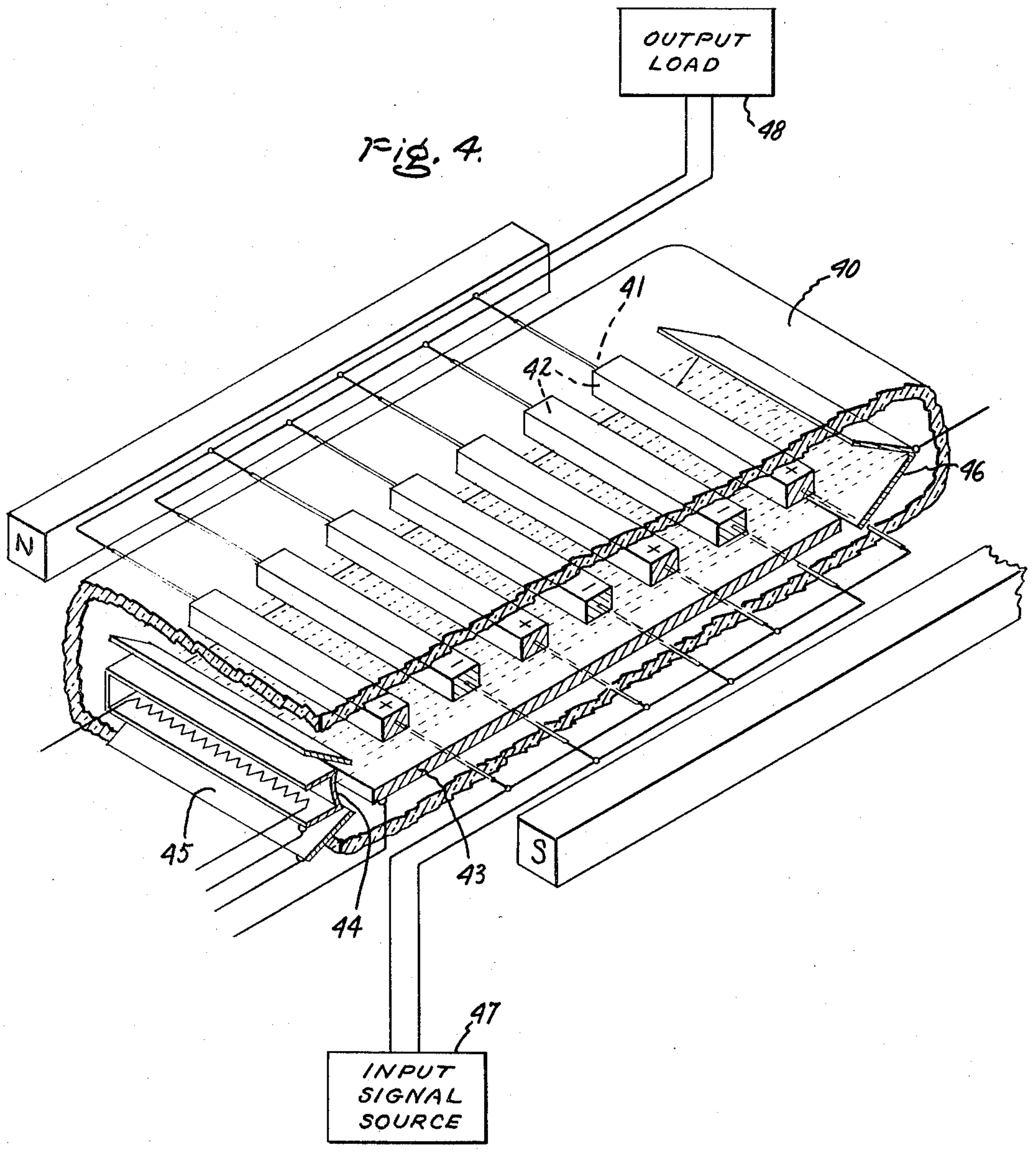
FIGURE 4 is a somewhat schematic partially sectionalized perspective view of another embodiment of the present invention.

Furthermore, and as seen in FIGURE 4, the present invention is not limited to coaxial transmission line types of devices but is also applicable to noncoaxial types. Specifically, the device of FIGURE 4 comprises an evacuated envelope 40 containing an anode assembly generally designated 41 and including a planar array of parallel equally-spaced elongated anode segments 42. Additionally, the device includes a planar cathode or sole plate 43 which is coextensive both with the array of anode segments and the length dimension of the segments. The anode structure and sole plate are adapted for having a D.C. electric field established therebetween for thus defining an interaction structure of substantial volume. Additionally, these electrodes cooperate for defining a transmission line effective for supporting and propagating an electromagnetic wave traveling parallel to the direction of the anode segments 42.

The device of FIGURE 4 further includes electron injection means including an elongated cathode 44 and a control electrode 45 which are provided for directing a sheet-beam of electrons between the anode structure and sole plate transverse to the electric field and any wave propagating down the transmission line parallel to the anode segment 42. A collector 46 is provided for collecting the electrons in the sheet beam. Suitable circuit means (not shown) are provided for energizing the cathode heater and applying appropriate operating potentials on the cathode, control electrode and collector. The cathode structure 44 is preferably comparable in length to the anode segments 42 to provide for maximum interaction between the beam and a wave propagating down the transmission line.

Located at opposite ends of the device and adapted for providing a magnetic field extending therethrough parallel to the anode segments are the opposite poles designated N and S of a magnet assembly. Provided at one end of the transmission line is R.F. signal input means comprising an input signal source generally designated 47 and connections effective for impressing upon the anode segments 42 a voltage such that at any instant of time immediately adjacent segments are alternately positive and negative with respect to a predetermined reference ground. This signal propagates toward the opposite ends of the anode structure as an ordinary TEM transmission line wave and at any plane in the device extending transverse the anode segments one would observe a transverse electric field periodically varying in direction. This electric field is identical in form to the $\pi$-mode electric field known to exist on such an anode structure when it is excited at one end as a slow wave structure propagating in a direction transverse to the segments of the anode structure. As mentioned in the discussion of the above-described coaxial structure, the periodic variation of electric fields corresponding to the passage of the TEM wave may be thought of as the superpositioning of two waves of equal amplitude propagating in opposite directions in the transverse plane. Either of the component waves can be synchronized with the sheet electron beam inasmuch as the phase velocity of the component waves depends upon the spacing between the anode segments, or in other words, the segments pitch of the anode structure, and can be much less than the velocity of light in the medium contained in the device.

The interaction between the electric field in the interaction space and the electron beam results in the abstraction of energy from the electrons, which energy is potential energy if crossed electric and magnetic fields are provided in the manner illustrated in FIGURE 4 or kinetic energy if longitudinal magnetic fields focussing is used. The abstracted energy appears as an increase in the amplitude of the TEM wave as it travels from the input to the output section of the device and, thusly, amplification of the input signal is obtained. At the output section of the device appropriate lead connections are provided for making connection to an output load generally designated 48.

While specific embodiments of the invention have been shown and described it is not desired that the invention be limited to the particular forms shown and described and it is intended by the appended claims to cover all modifications within the spirit and scope of the invention.

What is claimed as new and desired to be secured by Letters Patent of the United States is:

1. A transverse wave amplifier comprising spaced cathode and anode means defining a transmission line having a magnetron interaction space coincident therein, said transmission line adapted for supporting and propagating a fast electromagnetic wave having a slow wave electric field component extending transverse the direction of propagation of said fast wave, means for establishing an electron flow in said transmission line transverse the direction of propagation of said fast wave and parallel to the direction of said transverse slow wave electric field component thereof, electromagnetic wave signal input means directly coupled to said interaction space at only one section thereof for introducing an electromagnetic wave signal having a transverse electric field component at said one section in said magnetron interaction space, and separate output means directly coupled to said interaction space for extracting amplified electromagnetic wave energy from another spaced section of said magnetron interaction space longitudinally spaced a plurality of free-space wavelengths from said one section along the path of propagation of said fast wave.

2. A transverse wave amplifier comprising a pair of spaced conductive elements defining a magnetron interaction space therebetween, means for establishing an electric field across said interaction space, one of said conductive elements comprising a plurality of spaced parallel, elongated anode segments, said conductive elements constituting a transmission line coincident with said magnetron interaction space and effective for supporting and propagating an electromagnetic wave parallel to the direction of said anode segments and transverse said electric field, means for directing electrons transverse the directions of said anode segments and said electric field in said interaction space, input means directly coupled to said interaction space at only one section thereof being the only means and only position for coupling energy directly into said interaction space, separate output means being directly coupled to said interaction space at only axially spaced section thereof and being the sole means and sole position for directly coupling energy out of said interaction space, said input and output means located at longitudinally spaced sections of said interaction space in respect to the direction of energy propagation along said anode segments and spaced apart at least a purality of free-space wavelengths at a predetermined operating frequency of said amplifier, whereby an electromagnetic wave signal introduced at said input means into said magnetron interaction space is amplified by propagation along said interaction space in the direction of said anode segments and is extractable at said output means.

3. A transverse wave amplifier according to claim 2, including means for establishing a magnetic field extending parallel to the direction of said anode segments.

4. A transverse wave amplifier according to claim 2, wherein the length of said transmission line in the direction of said anode segments is at least three free-space wavelengths at a predetermined operating frequency of said amplifier.

5. A transverse wave amplifier comprising a coaxial transmission line having spaced inner and outer conductors defining an interaction space therebetween coincident with said transmission line, the outer of said conductors comprising a plurality of longitudinally extending anode segments, the inner of said conductors including an emissive surface, means for establishing an axial magnetic field along said transmission line, means for establishing a radial electric field across said interaction space, input means operatively interconnected to said anode and directly coupled to said interaction space at only one end section thereof for introducing an electromagnetic wave signal at said one section of said transmission line for propagation therealong and amplification from said magnetron interaction space, and separate output means directly coupled to said interaction space at only a limited axial section of said interaction space longitudinally spaced from said input means longitudinaly spaced from said one section and effective for extracting amplified wave energy from said transmission line.

6. A fast-wave, crossed-field electric discharge device comprising a coaxial transmission line having spaced inner and outer conductors defining an elongated annular interaction space therebetween, said outer conductor including a plurality of circumferentially spaced longitudinally extending anode segments, said inner conductor including an emissive cathode surface, means for establishing a magnetic field coaxial with said transmission line, means for establishing a radial electric field in said interaction space, input means coupled to one end of said transmission line for introducing an electromagnetic wave signal to be amplified for propagation along said line and energy exchange with electrons in said interaction space, and output means coupled to the opposite end of said transmission line for extracting amplified wave energy, said input and output means being separate means operatively interconnected with said outer conductor to directly couple a power signal into and from said interaction space at separate axially spaced locations only in said interaction space.

7. A fast-wave, crossed-field electric discharge device according to claim 6, wherein said input means is effective for introducing a $TE_{(N/2),1}$ mode electromagnetic wave signal where N equals the number of said anode segments.

8. A fast-wave, crossed-field electric discharge device according to claim 6, wherein the length of said interaction space is at least three free-space wavelengths at a predetermined operating frequency of said device.

9. A fast-wave, crossed-field electric discharge device comprising a coaxial transmission line having spaced inner and outer cylindrical conductors defining an elongated annular interaction space therebetween, said outer conductor including an equal number of circumferentially spaced, longitudinally and radially inwardly extending anode segments defining a plurality of circumferentially spaced elongated cavity resonators, said inner cylindrical conductor including an emissive cathode surface, means for establishing a magnetic field coaxial with said transmission line, means for establishing a radial electric field in said interaction space, input means in said outer conductor and extending through said outer conductor for direct coupling to said interaction space effective for coupling electromagnetic energy to be amplified into said annular interaction space into a plurality of circumferentially spaced ones of said cavity resonators at the ends thereof in only one section of said device for propagation along said transmission line and energy exchange with electrons in said interaction space, and output means in said outer conductor and extending through said outer conductor for direct coupling out of said interaction space and effective for extracting electromagnetic wave energy from a plurality of circumferentially spaced ones of said cavity resonators at a separate end section of said device longitudinally spaced from said one end section.

10. A fast-wave, crossed-field electric discharge device according to claim 9, wherein said input means and output means are each directly coupled to each said cavity resonators.

11. A fast-wave, crossed-field electric discharge device according to claim 9, wherein said input and output means comprise waveguide couplers iris-coupled to said cavity resonators.

12. A fast-wave, crossed-field electric discharge device according to claim 9, wherein said input and output means comprise coaxial R.F. terminals including inductive loops extending into said cavity resonators.

References Cited by the Examiner

UNITED STATES PATENTS

| | | | |
|---|---|---|---|
| 2,419,172 | 4/1947 | Smith | 315—39 |
| 2,485,401 | 10/1949 | McArthur | 315—39.75 X |
| 2,590,612 | 3/1952 | Hansell | 315—39.75 X |
| 2,761,091 | 8/1956 | Gutton et al. | 315—39.75 |
| 2,888,595 | 5/1959 | Warnecke et al. | 315—39.3 X |
| 2,896,117 | 7/1959 | Birdsall et al. | 315—39.3 |
| 2,953,714 | 9/1960 | Rostas | 315—39.75 X |
| 3,096,462 | 7/1963 | Feinstein | 315—39.53 |

JAMES W. LAWRENCE, *Primary Examiner.*

R. SEGAL, *Assistant Examiner.*